United States Patent
Kirschner et al.

(10) Patent No.: US 11,188,306 B1
(45) Date of Patent: Nov. 30, 2021

(54) DISTRIBUTED RANDOM-NUMBER GENERATOR

(71) Applicant: Nuvoton Technology Corporation, Hsin-chu (TW)

(72) Inventors: Yuval Kirschner, Even Yehuda (IL); Tamir Golan, Kibbutz Givaat-Chaim Meuchad (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 0 days.

(21) Appl. No.: 16/995,951

(22) Filed: Aug. 18, 2020

(51) Int. Cl.
*G06F 7/58* (2006.01)

(52) U.S. Cl.
CPC ........ *G06F 7/584* (2013.01); *G06F 2207/581* (2013.01)

(58) Field of Classification Search
CPC ................................................ G06F 7/58–588
See application file for complete search history.

(56) References Cited

U.S. PATENT DOCUMENTS

| 4,905,176 | A | 2/1990 | Schulz | |
|---|---|---|---|---|
| 8,024,386 | B2* | 9/2011 | Song | G06F 7/588 708/251 |
| 2009/0248771 | A1* | 10/2009 | Vergnes | G06F 7/588 708/251 |
| 2012/0221616 | A1* | 8/2012 | Yasuda | H03K 3/84 708/251 |
| 2013/0013657 | A1* | 1/2013 | Emelko | G06F 7/588 708/251 |

\* cited by examiner

*Primary Examiner* — Matthew D Sandifer
(74) *Attorney, Agent, or Firm* — Kligler & Associates Patent Attorneys Ltd

(57) ABSTRACT

A Random-Number Generator (RNG) includes a first plurality of High-Frequency (HF) clock generators, a second plurality of Low-Frequency (LF) clock generators, a third plurality of Digital Random-Number Generator circuits (DRNGs), and a multiplexer. The HF clock generators are configured to generate respective HF clock signals in a first frequency range. The LF clock generators are configured to generate respective LF clock signals in a second frequency range, lower than the first frequency range. Each DRNG is configured to derive a respective random-bit sequence from (i) a respective HF clock signal taken from among the HF clock signals and (ii) a respective LF clock signal taken from among the HF clock signals. The multiplexer is configured to produce an output sequence of random bits from random-bit sequences generated by the DRNGs.

19 Claims, 2 Drawing Sheets

DISTRIBUTED RANDOM-NUMBER GENERATOR

FIELD OF THE INVENTION

The present invention relates generally to random-number generation, and particularly to methods and systems for generating random bit sequences using multiple random-number generators.

BACKGROUND OF THE INVENTION

Various techniques for random-number generation are known in the art. For example, U.S. Pat. No. 4,905,176 describes a random number generator that is invulnerable to cryptographic attack. The principle of operation of the random number generator is based upon low-frequency sampling of the output of a pseudo-random number generator which is operated at a varying frequency from a free-running ring oscillator.

SUMMARY OF THE INVENTION

An embodiment of the present invention that is described herein provides a Random-Number Generator (RNG) including a first plurality of High-Frequency (HF) clock generators, a second plurality of Low-Frequency (LF) clock generators, a third plurality of Digital Random-Number Generator circuits (DRNGs), and a multiplexer. The HF clock generators are configured to generate respective HF clock signals in a first frequency range. The LF clock generators are configured to generate respective LF clock signals in a second frequency range, lower than the first frequency range. Each DRNG is configured to derive a respective random-bit sequence from (i) a respective HF clock signal taken from among the HF clock signals and (ii) a respective LF clock signal taken from among the HF clock signals. The multiplexer is configured to produce an output sequence of random bits from random-bit sequences generated by the DRNGs.

In some embodiments, a given DRNG includes (i) a respective Linear Feedback Shift Register (LFSR) that is clocked by the respective HF clock signal, and (ii) a respective Flip-Flop (FF) that is configured to sample an output of the respective LFSR in accordance with the respective LF clock signal. In various embodiments, at least two of the LFSRs differ from one another in one or more of (i) an initial seed, (ii) a feedback-tap configuration, and (iii) a number of cascaded FFs. In an alternative embodiment, a given DRNG includes a respective Flip-Flop (FF) that is configured to sample the respective HF clock signal in accordance with the respective LF clock signal.

In disclosed embodiments, the DRNGs are provided with respective different pairs of input clock signals, each pair including a respective HF clock signal and a respective LF clock signal. In an embodiment, the HF clock generators, the LF clock generators and the DRNGs are spatially dispersed over an area of an Integrated Circuit (IC). In some embodiments, the RNG further includes one or more analog noise sources configured to add analog noise to one or more of the HF clock generators and the LF clock generators.

In some embodiments, the multiplexer is configured to multiplex the random-bit sequences in a multiplexing order that alternates at random among the DRNGs. In an example embodiment, the multiplexer is configured to derive the multiplexing order from selected bits of one or more of the random-bit sequences.

In an embodiment, the HF clock generators and the LF clock generators are arranged in pairs, each pair including a respective HF clock generator and a respective LF clock generator. In another embodiment, at least two of the HF clock generators are configured to generate HF clock signals that differ in frequency from one another. Additionally or alternatively, at least two of the LF clock generators may be configured to generate LF clock signals that differ in frequency from one another. Further additionally or alternatively, at least two of the HF clock generators may be configured to be activated at different times. In yet another embodiment, at least two of the LF clock generators are configured to be activated at different times.

There is additionally provided, in accordance with an embodiment of the present invention, a method for random number generation including generating a first plurality of High-Frequency (HF) clock signals in a first frequency range, and generating a second plurality of Low-Frequency (LF) clock signals in a second frequency range, lower than the first frequency range. A third plurality of random-bit sequences is derived, each random-bit sequence derived from (i) a respective HF clock signal from the first plurality and (ii) a respective LF clock signal from the second plurality. An output sequence of random bits is produced from the random-bit sequences.

The present invention will be more fully understood from the following detailed description of the embodiments thereof, taken together with the drawings in which:

DETAILED DESCRIPTION OF EMBODIMENTS

Overview

Figure 1:
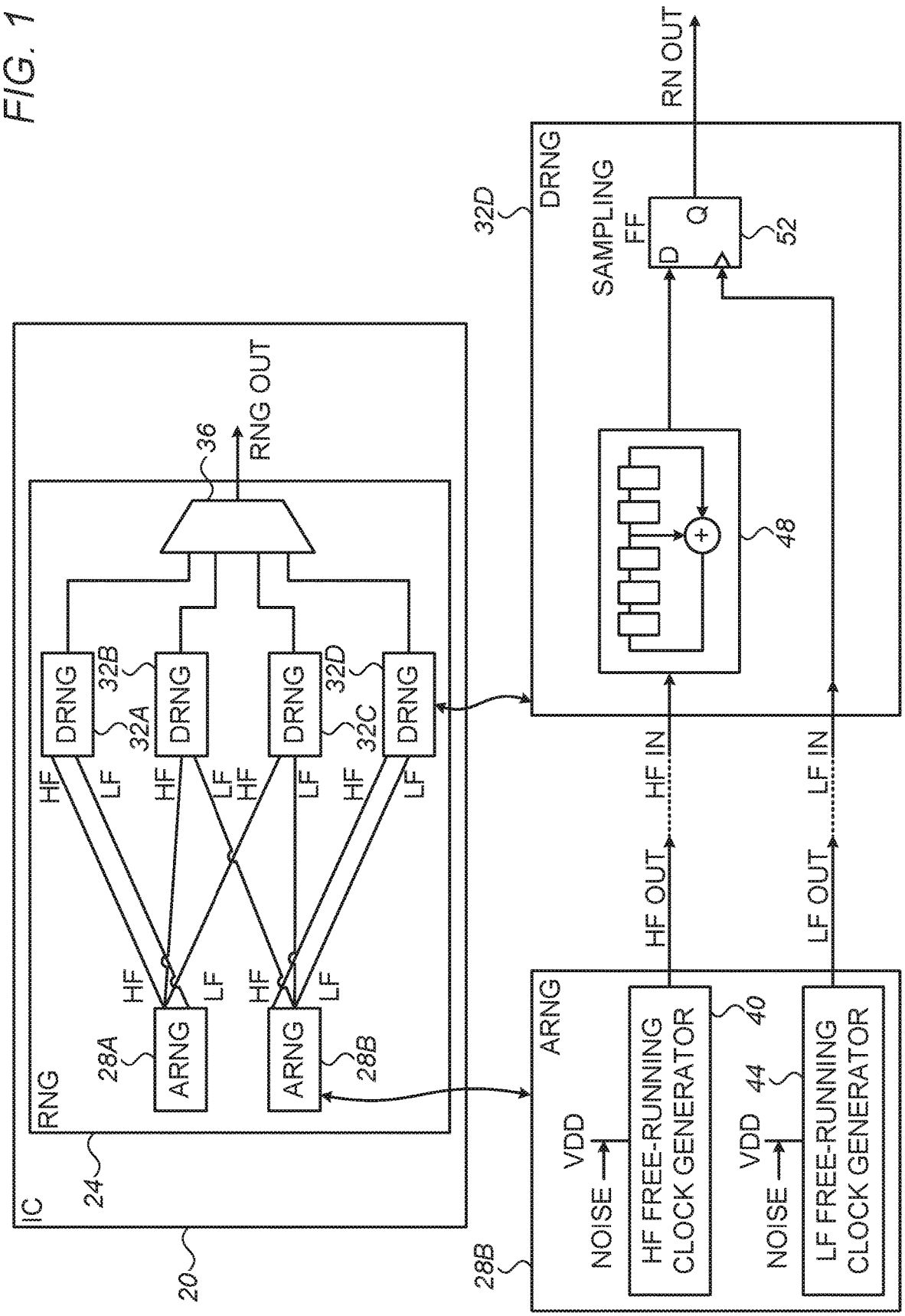
FIG. 1 is a block diagram that schematically illustrates an Integrated Circuit (IC) comprising a distributed Random-Number Generator (RNG), in accordance with an embodiment of the present invention.

Embodiments of the present invention that are described herein provide improved methods and circuits for random number generation. The disclosed Random Number Generators (RNGs) generate random numbers with high throughput and high level of randomness. The disclosed RNGs are also highly resilient to hostile attacks that attempt to degrade or diminish the randomness of the output sequence of random bits.

In some embodiments, a RNG comprises multiple free-running High-Frequency (HF) clock generators and multiple free-running Low-Frequency (LF) clock generators. The HF clock generators are configured to generate respective HF clock signals in a first frequency range (e.g., on the order of MHz). The LF clock generators are configured to generate respective LF clock signals in a second frequency range, lower than the first frequency range (e.g., on the order of KHz). In some embodiments, analog noise may be added to any of the clock generators. Such noise addition is particularly effective in the LF clock generators.

The RNG further comprises multiple Digital Random-Number Generator circuits (DRNGs). Each DRNG is provided with a selected pair of {HF clock signal, LF clock signal} as input. Typically, different DRNGs are provided with different { HF clock signal, LF clock signal} pairs, although any individual clock signal (HF or LF) may be used for driving more than a single DRNG.

Each DRNG is configured to generate a respective random-bit sequence using the HF clock signal and the LF clock signal it is provided with. In some embodiments, each DRNG comprises a Linear Feedback Shift Register (LFSR) that is clocked by the respective HF clock signal, and a Flip-Flop (FF) that samples the output of the LFSR in accordance with the respective LF clock signal. Since the LFSR output is sampled at a much lower rate than the actual LFSR clock rate, and since the LF sampling clock is typically noisy, the resulting random-bit sequence is indeed highly random.

The RNG further comprises a multiplexer configured to produce an output sequence of random bits from the random-bit sequences generated by the DRNGs. By multiplexing the outputs of multiple DRNGs, the disclosed RNG can provide a high throughput of random numbers. In some embodiments, the multiplexer further enhances the randomness of its output by using a multiplexing order that alternates at random among the DRNGs.

Since the clock generators (HF and LF) are free running, not synchronized with one another and noisy, and since each DRNG is provided with a different combination of {HF clock signal, LF clock signal}, random-bit sequences generated by the different DRNGs have little or no correlation with one another. As such, the multiplexed sequence of bits produced by the multiplexer has a high degree of randomness.

By reusing the same HF clock signals and LF clock signals in different combinations, a small number of HF and LF clock generators can be used for driving a large number of DRNGs, without compromising randomness. This feature reduces the RNG cost, size and power consumption.

In some embodiments, the RNG is implemented as part of an Integrated Circuit (IC), and the various RNG elements (HF clock generators, LF clock generators and DRNGs) are spatially dispersed over the IC area. As a result, different clock generators pick up analog noise having different statistics, which assists in de-correlating the different clock signals. Moreover, an attack on a specific region of the IC 20 is unlikely to affect the output of more than a single DRNG. Even if an attack succeeds in causing a specific DRNG to output a deterministic sequence, the overall RNG output will remain highly random. This property is further strengthened when the multiplexing order is random.

Various example implementations and variations of the disclosed RNG are described.

System Description

FIG. 1 is a block diagram that schematically illustrates an Integrated Circuit (IC) 20 comprising a distributed Random-Number Generator (RNG) 24, in accordance with an embodiment of the present invention. In various embodiments, IC 20 may comprise, for example, a secure controller, a secure memory device or any other type of IC that utilizes random numbers. Circuitry other than RNG 24 is omitted from the figure for the sake of clarity. In other embodiments, IC 20 may be dedicated for random number generation.

RNG 24 comprises two or more Analog RNG circuits (ARNGs) 28, in the present example two ARNGs denoted 28A and 28B. Each ARNG is configured to generate a respective High-Frequency (HF) clock signal and a respective Low-Frequency (LF) clock signal. In some embodiments the LF clock signal frequencies are on the order of KHz, and the HF clock signal frequencies are on the order of MHz, although any other suitable frequency ranges can be used.

RNG 24 further comprises two or more Digital RNG circuits (DRNGs) 32, in the present example four DRNGs denoted 32A-32D. Each DRNG 32 is configured to derive a random bit sequence from a respective HF clock signal and a respective LF clock signal. The HF clock signal and the LF clock signal provided to a given DRNG 32 may be generated by the same ARNG 28 or by different ARNGs 28. A given clock signal (HF clock signal or LF clock signal) may be provided to a single DRNG 32 or to multiple DRNGs 32. Typically, different DRNGs 32 are provided with different pairs of {HF clock signal, LF clock signal}.

RNG 24 further comprises a multiplexer (MUX) 36, also referred to as a combiner. Multiplexer 36 is configured to multiplex the random bit sequences generated by DRNGs 32, so as to output a high-rate sequence of random bits denoted RNG OUT. This sequence is provided as the output of RNG 24. (As will be explained below, MUX 36 is typically not a simple MUX that selects one input from among multiple inputs, but a circuit that concatenates bits or groups of bits to form a random bit stream.)

Insets at the bottom of FIG. 1 illustrate the internal structures of ARNGs 28 and DRNGs 32. ARNG 28B and DRNG 32D are depicted as examples; the other ARNGs and DRNGs, respectively, typically have similar internal structures.

As seen in the left-hand side inset, each ARNG 28 comprises (i) a respective HF free-running clock generator 40 that generates a respective HF clock signal (denoted HF OUT), and (ii) a respective LF free-running clock generator 44 that generates a respective LF clock signal (denoted LF OUT). Typically, clock generators 40 and 44 in a given ARNG 28 are not synchronized with one another, and not synchronized with clock generators 40 and 44 of the other ARNGs 28.

To increase randomness, in some embodiments analog noise is added to one or both of clock generators 40 and 44, in one or more of the ARNGs. The analog noise may be produced intentionally by circuitry dedicated for this purpose. The noise may be added to the supply voltage (VDD) of the clock generator, or at any other point that assists in randomizing the clock generator output. Alternatively, the clock generator may pick-up analog noise from its surrounding environment without a need for additional circuitry.

As seen in the right-hand side inset, each DRNG 32 comprises a respective Linear Feedback Shift Register (LFSR) 48 and a respective sampling Flip-Flop (FF) 52. Each LFSR 48 comprises a cascade of multiple FFs, with one or more feedback taps. In each DRNG, LFSR 48 is clocked by the HF clock signal provided to the DRNG (denoted HF IN), and thus outputs a pseudo-random sequence at the rate of the HF clock signal. FF 52 samples the output of LFSR 48 at a fraction of this rate, in accordance with the LF clock signal provided to the DRNG (denoted LF IN). The random bit sequence at the output (Q) of FF 52 is provided as the output of the DRNG (denoted RN OUT). RN OUT has the same rate as the LF clock signal (LF IN).

The multiple RN OUT random bit sequences, generated by the multiple DRNGs 32, are provided as the inputs of multiplexer 36. Multiplexer 36 multiplexes the multiple RN OUT random bit sequences to produce the high-rate RNG OUT random bit sequence.

In some embodiments, ARNGs 28 and DRNGs 32 are deliberately not collocated, but spatially dispersed over the area of IC 20. This spatial distribution is advantageous for several reasons. For example, when spatially dispersed, different ARNGs pick up analog noise having different statistics, which assists in de-correlating the different clock signals (HF or LF). As another example, a malicious attack on a specific region of IC 20 is unlikely to damage more than a single ARNG or DRNG. Even if damaging an ARNG or DRNG causes the ARNG or DRNG to output a fixed or deterministic bit sequence, since the other ARNGs and DRNGs are still functional, the likelihood of degrading the randomness of the overall RNG OUT sequence is small.

In various embodiments, multiplexer 36 may multiplex the random bit sequences produced by DRNGs 32 in various ways. Referring to the configuration of FIG. 1, let the outputs of DRNGs 32A-32D be denoted stream1-stream4, respectively. In some embodiments, multiplexer 36 multiplexes the random bit sequences in a predefined, deterministic, cyclic multiplexing order. For example, multiplexer 36 may output n bits (e.g., n=2) from stream1, then n bits from stream2, then n bits from stream3, then n bits from stream4, then again n bits from stream1, and so on. Any other suitable deterministic multiplexing order can be used in alternative embodiments.

In other embodiments, multiplexer 36 may multiplex the random bit sequences produced by DRNGs 32 in a multiplexing order that alternates at random among the DRNGs. In the present context, the term "alternating at random" means that (i) the order of alternation from one random-bit sequence to another is random, and/or (ii) the number of bits taken from a given random-bit sequence when visited, is random. In an example embodiment, multiplexer 36 derives the random multiplexing order from selected bits of one or more of the random-bit sequences. For example, multiplexer 36 may carry out the following process:

Take one bit from stream1. If the bit value is "0", take two bits from stream2, concatenate with two bits from stream3, concatenate with two bits from stream4, concatenate with two bits from stream1. If the bit value is "1", take two bits from stream3, concatenate with two bits from stream1, concatenate with two bits from stream2, concatenate with two bits from stream4.

Take one bit from stream2. If the bit value is "0", take two bits from stream1, concatenate with two bits from stream3, concatenate with two bits from stream4, concatenate with two bits from stream2. If the bit value is "1", take two bits from stream3, concatenate with two bits from stream2, concatenate with two bits from stream4, concatenate with two bits from stream1.

Take one bit from stream 3, and continue the process in a similar manner.

The example multiplexing order above is given purely by way of example. In alternative embodiments, multiplexer 36 may use any other suitable multiplexing order, and any other suitable process that derives the multiplexing order, e.g., from selected bits of the random bit sequences generated by one or more of DRNGs 32.

The configurations of RNG 24 and its elements, as shown in FIG. 1, are example configurations that are depicted purely for the sake of conceptual clarity. In alternative embodiments, any other suitable configurations can be used. For example, RNG 24 may comprise any other suitable number of ARNGs 28 and any other suitable number of DRNGs 32. The interconnection scheme between the ARNGs and DRNGs (i.e., the choice of which HF clock signal and which LF clock signal to provide to each DRNG) can also be set in any other suitable way. Further alternatively, HF clock generators 40 and LF clock generators 44 need not necessarily be arranged in collocated pairs. More generally, the number of HF clock generators 40 may differ from the number of LF clock generators 44.

In some embodiments, HF clock generators 40 generate HF clock signals that all have the same frequency. In other embodiments, at least two of the HF clock generators generate HF clock signals that differ in frequency from one another. By the same token, in some embodiments LF clock generators 44 generate LF clock signals that all have the same frequency. In other embodiments, at least two of the LF clock generators generate LF clock signals that differ in frequency from one another.

In some embodiments, to increase randomness, at least two of HF clock generators 40 are configured to be activated at different times. Additionally or alternatively, at least two of LF clock generators 44 may be configured to be activated at different times.

In some embodiments, all LFSRs 48 in all DRNGs 32 are initialized to the same seed (reset value). In other embodiments, at least two of the LFSRs (possibly all LFSRs) are initialized to different seeds. In an example embodiment, LFSRs 48 are initialized to respective random values independently of one another. Initialization to a random seed may be implemented, for example, by implementing one or more of the FFs of the LFSR without reset logic, so that these FFs are set to arbitrary values upon reset.

In some embodiments, all LFSRs 48 in all DRNGs 32 have the same feedback-tap configuration (same sequence generation polynomial). In other embodiments, at least two of the LFSRs (possibly all LFSRs) differ from one another in the feedback-tap configuration. In some embodiments, all LFSRs 48 in all DRNGs 32 have the same number of cascaded FFs. In other embodiments, at least two of the LFSRs (possibly all LFSRs) differ from one another in the number of cascaded FFs.

In yet another embodiment, in at least one of DRNGs 32 (possibly in all DRNGs), LFSR 48 can be omitted altogether. In such a DRNG, FF 52 samples the HF clock signal directly, using the LF clock signal.

In various embodiments, RNG 24 and its elements may be implemented using any suitable hardware, such as in an Application-Specific Integrated Circuit (ASIC) or Field-Programmable Gate Array (FPGA). In some embodiments, some of the functions of RNG 24 may be performed by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

RNG Method Description

Figure 2:
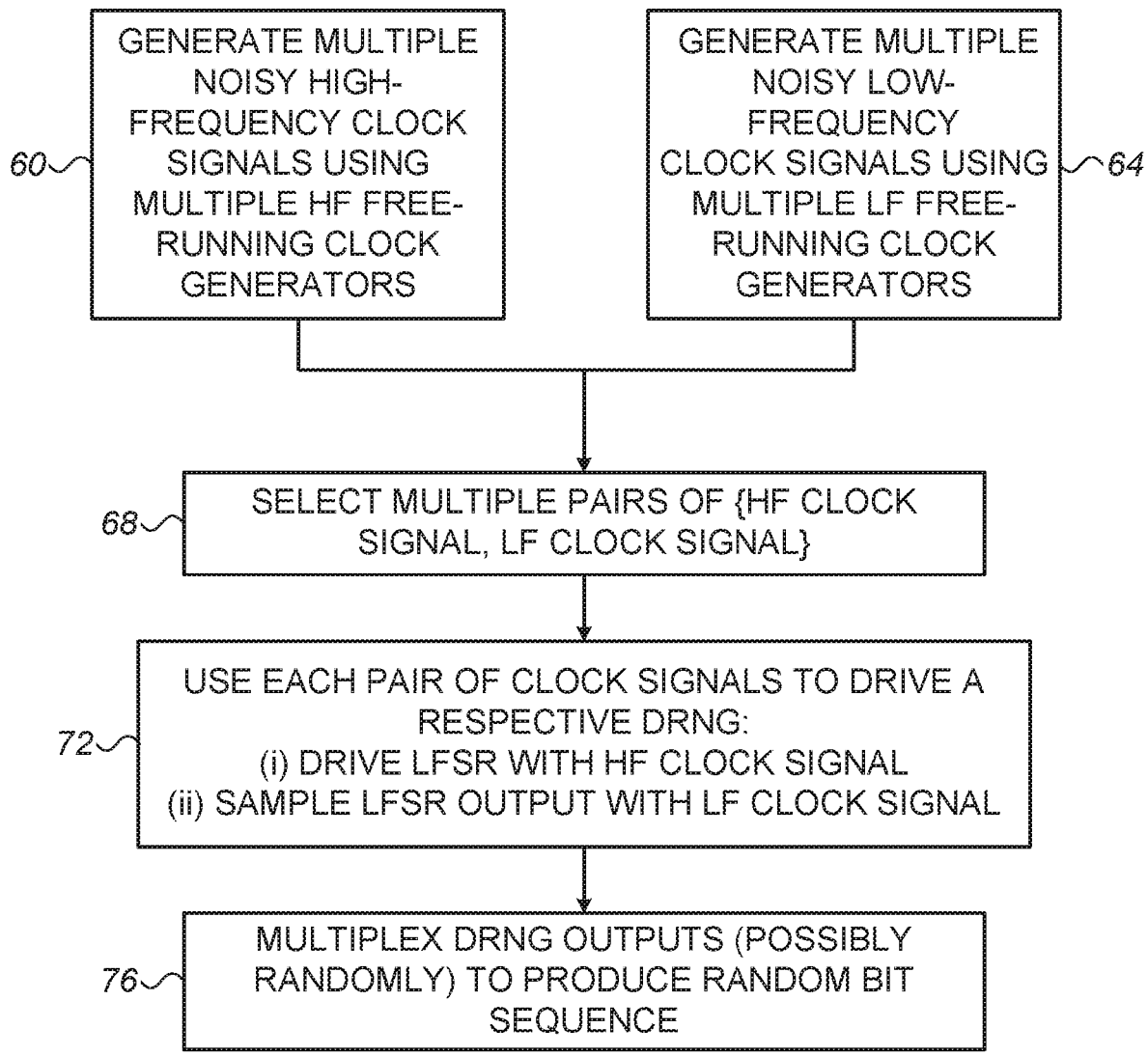
FIG. 2 is a flow chart that schematically illustrates a method for distributed random-number generation, in accordance with an embodiment of the present invention.

FIG. 2 is a flow chart that schematically illustrates a method for distributed random-number generation using RNG 24 in IC 20, in accordance with an embodiment of the present invention. The method begins with HF free-running clock generators 40 generating multiple HF clock signals, at a HF clock generation step 60. In parallel, LF free-running clock generators 44 generate multiple noisy LF clock signals, at a LF clock generation step 64.

At a selection step 68, multiple pairs of {HF clock signal, LF clock signal} are selected. (This step is largely illustrative or implicit—Typically, the selection is predefined.) At a sequence generation step 72, each DRNG 32 generates a respective random bit sequence using the pair of {HF clock signal, LF clock signal} it is provided with. For a given DRNG, the HF clock signal is used for clocking LFSR 48, and the LF clock signal is used for clocking FF 52 (i.e., for sampling the LFSR output).

At a multiplexing step 76, multiplexer 36 multiplexes the random bit sequences produced by DRNGs 32, and outputs the multiplexed random bit sequence. As explained above, the multiplexing order may be deterministic or random.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Random-Number Generator (RNG), comprising:
   a first plurality of High-Frequency (HF) clock generators, configured to generate respective HF clock signals in a first frequency range;
   a second plurality of Low-Frequency (LF) clock generators, configured to generate respective LF clock signals in a second frequency range, lower than the first frequency range;
   a third plurality of Digital Random-Number Generator circuits (DRNGs), each DRNG configured to derive a respective random-bit sequence from (i) a respective HF clock signal taken from among the HF clock signals and (ii) a respective LF clock signal taken from among the HF clock signals; and
   a multiplexer, configured to produce an output sequence of random bits from random-bit sequences generated by the DRNGs.

2. The RNG according to claim 1, wherein at least two DRNGs each comprise (i) a respective Linear Feedback Shift Register (LFSR) that is clocked by the respective HF clock signal, and (ii) a respective Flip-Flop (FF) that is configured to sample an output of the respective LFSR in accordance with the respective LF clock signal.

3. The RNG according to claim 2, wherein at least two of the LFSRs differ from one another in one or more of (i) an initial seed, (ii) a feedback-tap configuration, and (iii) a number of cascaded FFs.

4. The RNG according to claim 1, wherein a given DRNG comprises a respective Flip-Flop (FF) that is configured to sample the respective HF clock signal in accordance with the respective LF clock signal.

5. The RNG according to claim 1, wherein the DRNGs are provided with respective different pairs of input clock signals, each pair comprising a respective HF clock signal and a respective LF clock signal.

6. The RNG according to claim 1, wherein the HF clock generators, the LF clock generators and the DRNGs are spatially dispersed over an area of an Integrated Circuit (IC).

7. The RNG according to claim 1, further comprising one or more analog noise sources configured to add analog noise to one or more of the HF clock generators and the LF clock generators.

8. The RNG according to claim 1, wherein the multiplexer is configured to multiplex the random-bit sequences in a multiplexing order that alternates at random among the DRNGs.

9. The RNG according to claim 8, wherein the multiplexer is configured to derive the multiplexing order from selected bits of one or more of the random-bit sequences.

10. The RNG according to claim 1, wherein the HF clock generators and the LF clock generators are arranged in pairs, each pair comprising a respective HF clock generator and a respective LF clock generator.

11. The RNG according to claim 1, wherein at least two of the HF clock generators are configured to generate HF clock signals that differ in frequency from one another.

12. The RNG according to claim 1, wherein at least two of the LF clock generators are configured to generate LF clock signals that differ in frequency from one another.

13. The RNG according to claim 1, wherein at least two of the HF clock generators are configured to be activated at different times.

14. The RNG according to claim 1, wherein at least two of the LF clock generators are configured to be activated at different times.

15. A method for random number generation, comprising:
   generating a first plurality of High-Frequency (HF) clock signals in a first frequency range by a first plurality of clock generators;
   generating a second plurality of Low-Frequency (LF) clock signals in a second frequency range, lower than the first frequency range, by a second plurality of clock generators;
   deriving, by a third plurality of Digital Random-Number Generator circuits (DRNGs), a third plurality of random-bit sequences, each DRNG configured to derive a respective random-bit sequence from (i) a respective HF clock signal from the first plurality of HF clock signals and (ii) a respective LF clock signal from the second plurality of LF clock signals; and
   producing, by a multiplexer, an output sequence of random bits from the random-bit sequences generated by the DRNGs.

16. The method according to claim 15, wherein deriving a given random-bit sequence in the third plurality comprises (i) clocking a Linear Feedback Shift Register (LFSR) by the respective HF clock signal, and (ii) sampling an output of the respective LFSR by a respective Flip-Flop (FF) in accordance with the respective LF clock signal.

17. The method according to claim 15, wherein deriving a given random-bit sequence in the third plurality comprises sampling the respective HF clock signal by a respective Flip-Flop (FF) in accordance with the respective LF clock signal.

18. The method according to claim 15, wherein producing the output sequence comprises multiplexing the random-bit sequences in a multiplexing order that alternates at random among the random-bit sequences.

19. The method according to claim 18, wherein multiplexing the random-bit sequences comprises deriving the multiplexing order from selected bits of one or more of the random-bit sequences.

* * * * *